(12) United States Patent
Liao et al.

(10) Patent No.: US 6,421,312 B1
(45) Date of Patent: Jul. 16, 2002

(54) DETECTION SCHEME FOR COMPACT DISK OR DIGITAL VIDEO DISK MEDIA PROPER INSTALLATION

(75) Inventors: Reynold Liao, Austin; Sean O'Neal, Round Rock; Mark White, Austin, all of TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 09/189,413

(22) Filed: Nov. 9, 1998

(51) Int. Cl.$^7$ ............................................. G11B 17/022
(52) U.S. Cl. ....................................... 369/77.1
(58) Field of Search ................................ 369/77.1, 77.2, 369/75.1, 75.2, 270, 185, 187, 186; 360/99.12

(56) References Cited

U.S. PATENT DOCUMENTS

| | | | | |
|---|---|---|---|---|
| 3,315,840 A | * | 4/1967 | TollKuhn ..................... | 221/75 |
| 4,376,997 A | * | 3/1983 | Eggers ......................... | 369/270 |
| 4,768,185 A | * | 8/1988 | Camerik ....................... | 369/270 |
| 4,914,421 A | * | 4/1990 | d'Arc et al. .................. | 340/568 |
| 4,995,027 A | * | 2/1991 | Aoyagi et al. ................ | 369/77.1 |
| 5,136,570 A | * | 8/1992 | Takai et al. .................. | 369/77.1 |
| 5,150,340 A | * | 9/1992 | Miura et al. .................. | 369/33 |
| 5,191,569 A | * | 3/1993 | Kurosawa et al. ............ | 369/38 |
| 5,255,136 A | * | 10/1993 | Machado et al. ............. | 360/77.02 |
| 5,270,989 A | | 12/1993 | Kimura ......................... | 369/37 |
| 5,303,098 A | * | 4/1994 | Yamamori et al. ........... | 360/99.12 |
| 5,586,105 A | * | 12/1996 | Mizuno et al. ............... | 369/270 |
| 5,828,641 A | * | 10/1998 | Abe et al. .................... | 369/77.1 |
| 5,901,129 A | * | 5/1999 | Takahashi et al. ........... | 369/75.2 |
| 5,933,291 A | * | 8/1999 | Kanzawa et al. ............. | 360/99.06 |
| 5,956,315 A | * | 9/1999 | Sawai et al. .................. | 369/270 |
| 5,974,016 A | * | 10/1999 | Andrews et al. .............. | 369/77.1 |
| 6,014,351 A | * | 11/2000 | Kinoshita ...................... | 369/33 |
| 6,169,711 B1 | * | 1/2001 | Koh .............................. | 369/33 |

OTHER PUBLICATIONS

Goldwasser, Sam. "Troubleshooting CD–player startup problems", Electonics Now, Sep. 1998, pp. 25–28.*

* cited by examiner

Primary Examiner—Allen Cao
(74) Attorney, Agent, or Firm—Skjerven Morrill LLP

(57) ABSTRACT

An apparatus and method for detecting seating of a medium on a media tray includes a conductive element having a first terminal and a second terminal and forming an interrupted circuit between the first terminal and the second terminal; and a spindle structurally supporting and integral with the conductive element, the spindle adapted to receive an edge of the medium, the medium causing completion of a conductive pathway of the interrupted circuit between the first and second terminal when seated upon the spindle. A plurality of switches is coupled to the outer circumference of the spindle and a tray with a circular medium receiving area mechanically and electrically coupled to the spindle and the circuit, with the plurality of switches engaged in operative relation to movable members coupled to the outer circumference of the spindle. Another apparatus and method includes a conductive element incorporated into a media tray having a first terminal and a second terminal integral with the media tray. The receipt of the circular medium upon the tray completing the electrical circuit. The apparatus includes a plurality of switches coupled to the receiving area of the media try that engage in operative relation to movable members coupled to the receiving are of the media tray.

15 Claims, 4 Drawing Sheets

DETECTION SCHEME FOR COMPACT DISK OR DIGITAL VIDEO DISK MEDIA PROPER INSTALLATION

BACKGROUND OF THE INVENTION

1. Field of the Invention

The present invention relates to a detection mechanism for a disk player for playing optical disks such as compact disks (CDs) and Digital Video Disks (DVDs).

2. Description of the Related Art

Personal computer systems have attained widespread use. A personal computer system can usually be defined as a desktop or portable microcomputer that includes a system unit having a system processor or central processing unit (CPU) with associated memory, a display panel, a keyboard, a hard disk storage device or other type of storage medium such as a floppy disk drive or a Compact Disk, Read-Only Memory (CD ROM) drive. These personal computer systems are information handling systems designed primarily to give independent computing power to a single user or group of users.

A portable computer is a self-contained personal computer easily moved and operated in various locations. Portable computers are typically laptop, notebook or subnotebook computers. To be portable, these computers are small, compact, and lightweight. The conventional portable computer generally includes a base portion and a moveable lid portion. The lid portion contains a flat panel display such as a liquid crystal display (LCD) or other relatively thin display. The base portion contains computer components including disk drives.

Many portable computers include Compact Disk (CD) or Digital Versatile Disk (DVD) drives. Compact Disks (CDs) and Digital Versatile Disk (DVDs) are popular because of the ability of a single disk to hold a large quantity of data. A CD is a nonmagnetic disk, typically 4.72 inches (12 centimeters) in diameter, and can store as much as 680 megabytes of data. The technology behind CDs and CD-ROM disks is optical technology. CD technology incorporates light waves to encode binary data later read by a photodetector, called a playback laser. The light waves generated by the laser beam burn microscopic pits into the surface of the CD. A low power laser reads the data on the CD by sensing the pits on the surface of the CD. The CD itself is a plastic material aluminized to create a reflective finish for optical purposes and laminated with a clear plastic for protection. Despite the protective coating on a CD, a scratch on a CD can prevent the disk from being read. Like a CD, a DVD is a nonmagnetic disk, also typically 4.72 inches in diameter. A DVD disk can store 4.3 gigabytes of data and requires a DVD drive that resembles a CD drive. Physically, a DVD disk is similar to a CD with the same concerns for scratching. Hereinafter, any references to CD or DVD disks or drives will be referred to jointly as "CD" disks and drives.

In order to include a CD drive on a portable computer, a computer typically includes a drive bay in the base portion or an external drive coupled to the computer. For those portable computers in which the CD drive is in the base portion of the computer, the drive design governs the handling of the CD as well as the mechanism for placing the CD into an optical assembly for reading. In many computers, the mechanism for the CD drive is a sliding drawer in which a micromotor or spring slides the drawer out, the CD is placed in the drawer, and then the drawer is pushed closed either by a motor or by pushing.

Portable computers that have a CD drive incorporated into the computer typically use the sliding drawer mechanism. Unlike desktop PC CD drives, the sliding drawer CD drives incorporated into a portable computer typically include a snap-on spindle to which the CD must be snapped before sliding the drawer into the drive. Space considerations cause the primary differences between desktop computer CD drives and portable computer CD drives. CD drives for portable computers typically must fit into a smaller area. For this reason, CD drives often incorporate the optical components into the sliding drawer that ejects from the computer. A problem with the snap feature on portable computers is misuse by the computer user. A user can improperly install a CD without fully snapping the CD onto the spindle. When this occurs, significant damage can result to both the CD and to the CD drive. The drive could experience read/write failures or the CD can become damaged if it comes into contact with stationary components located inside the CD drive or the computer system.

What is needed is a portable CD drive with a seating method and apparatus that detects proper seating of an installed CD.

SUMMARY OF THE INVENTION

Accordingly, an apparatus and method are presented that detect proper seating of a CD by incorporating a circuit into a spindle in one embodiment, or into a media tray in another embodiment.

According to an embodiment, the apparatus is incorporated into a media tray and includes a circuit and a spindle. The circuit is integral with the spindle, the spindle adapted to receive an inner edge of a circular medium defining an aperture in the center therewith, the receipt of the inner edge of the circular medium upon the spindle completing the circuit. The apparatus further includes a plurality of switches coupled to the outer circumference of the spindle and a tray with a circular medium receiving area mechanically and electrically coupled to the spindle and the circuit, with the plurality of switches engaged in operative relation to movable members coupled to the outer circumference of the spindle.

According to another embodiment, an apparatus is presented that detects proper seating of a CD. According to this embodiment, the apparatus is incorporated into a media tray and includes a circuit that is integral with the media tray. The receipt of the circular medium upon the tray completes electrical circuit. The apparatus includes a plurality of switches coupled to the receiving area of the media tray that engage in operative relation to movable members coupled to the receiving area of the media tray.

The inner edge of the circular medium activates the plurality of switches when the circular medium is flush with the receiving area and the inner edge of the circular medium maintains the plurality of switches in an inactive state when the circular medium is not flush with the receiving area. The activation of the plurality of switches completes the circuit.

According to another embodiment, a computer system is presented that includes a circuit integral with a spindle, the spindle adapted to receive an inner edge of a circular medium defining an aperture in the center therewith, the receipt of the inner edge of the circular medium upon the spindle completing the electrical circuit. The computer system includes a controller coupled to a circuit; an optical unit coupled to the circuit; and a servo controller coupled to the circuit, wherein the completion of the circuit transmits a signal to the optical unit, the servo controller and the controller, the signal preventing the spindle from rotating the circular medium.

According to another embodiment, a method for detecting a medium on a media tray is presented. The method includes providing a conductive element having a first terminal and a second terminal and forming an interrupted circuit between the first terminal and the second terminal, and providing a spindle structurally supporting and integral with the conductive element, the spindle adapted to receive an edge of the medium, the medium causing completion of a conductive pathway of the interrupted circuit between the first and second terminal when seated upon the spindle.

BRIEF DESCRIPTION OF THE DRAWINGS

The present invention may be better understood, and its numerous objects, features, and advantages made apparent to those skilled in the art by referencing the accompanying drawings.

FIG. 2B shows a spindle with media, a CD, properly seated on the spindle.

FIG. 2C shows a spindle with no media seated on the spindle.

FIG. 4A represents the position of a snap switch before placing a CD on a spindle.

FIG. 4B represents the position of a switch when a CD is incorrectly seated on a spindle.

FIG. 4C represents the position of a switch when a CD is correctly seated on a spindle.

The use of the same reference symbols in different drawings indicates similar or identical items.

DESCRIPTION OF THE PREFERRED EMBODIMENT(S)

The following description is intended to be illustrative of the invention and should not be taken to be limiting.

Figure 1:
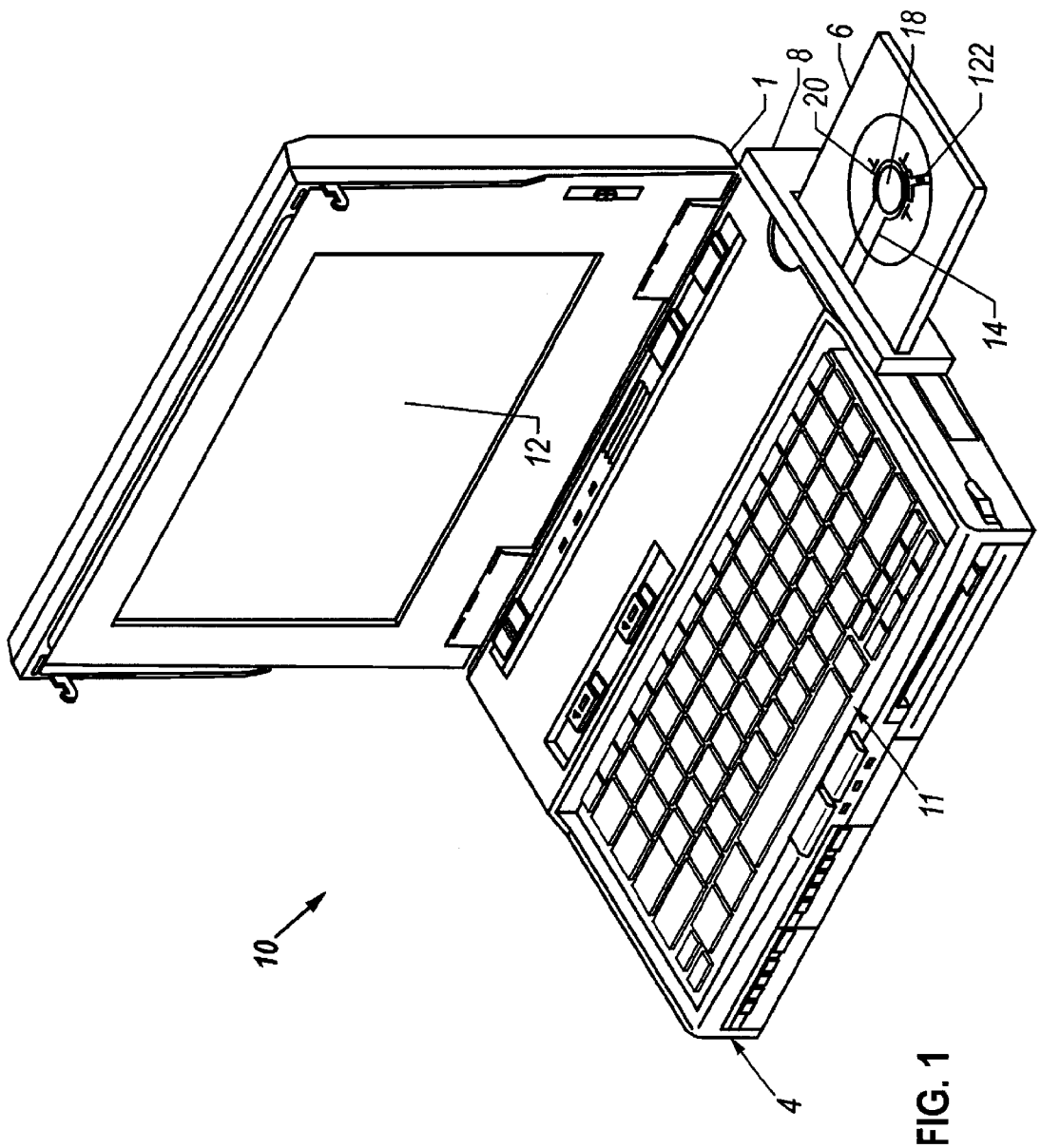
FIG. 1 is a perspective view of a portable computer in accordance with the present invention.

FIG. 1 shows a perspective view of a portable computer 10. The portable computer 10 includes a display portion 12 attached to a base portion 4. The base portion includes a keyboard 11 and a CD drive 8. The CD drive 8 slidably ejects a tray 6. In the center of the tray 6 is a spindle 18 for placing media such as a CD or DVD disk. Either the tray 6 or the drive includes an optical reading device 16 for optically reading data from media placed on the tray 6.

Also incorporated into tray 6 is a circuit 14 integral with the spindle 18 in accordance with an embodiment of the present invention. The circuit 14 detects proper seating of the media on the spindle 18 on the tray 6. The circuit 14 detects proper seating of the media seated in the spindle 18 by operation of a plurality of switches 20. When the switches are in a closed position, the circuit 14 is a "closed circuit." The circuit 14 indicates proper seating of the media when the circuit 14 is "closed."

According to one embodiment, when the portable computer 10 receives the media, the spindle 18 does not rotate or spin the media unless the circuit 14 is "closed". Alternatively, the spindle 18 will rotate or spin the media even though the circuit 14 is "open" if the circuit generates an error message to the computer user that can be overridden. Alternatively, one skilled in the art can connect the signal from circuit 14 to the Basic Input/Output System (BIOS) such that the user can run BIOS Setup to provide a disabling option allowing the spindle 18 to rotate even though the circuit is "open". If the spindle 18 does not rotate, the optical unit 122 will not read the media. The manner in which the circuit 14 operates to prevent rotation of the spindle 18 is discussed in detail below.

Figure 2A:
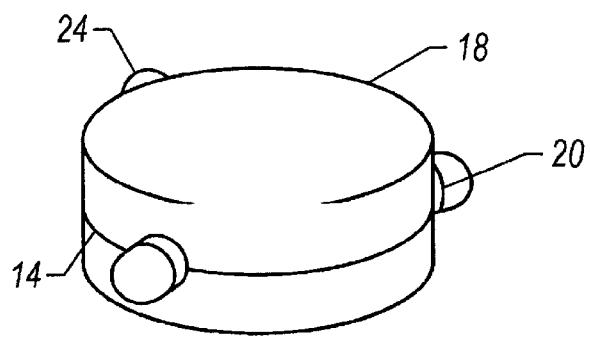
FIG. 2A is a perspective side view of a spindle incorporating a circuit in accordance with an embodiment of the present invention.
Figure 2B:
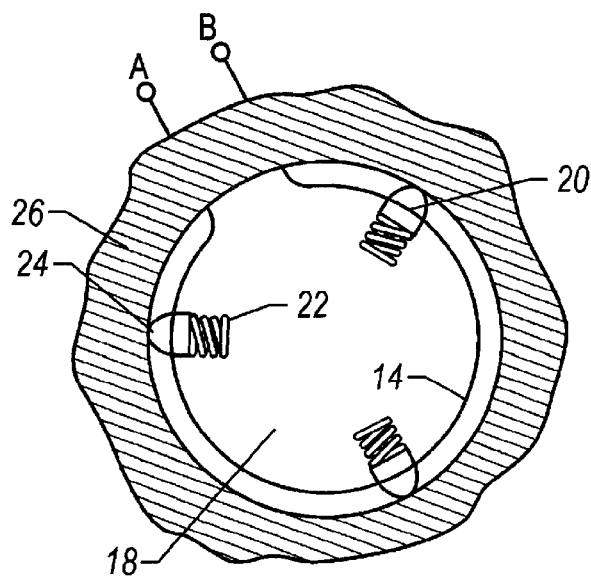
FIGS. 2B and 2C are top views of the spindle incorporating a circuit in accordance with an embodiment of the present invention.
Figure 2C:
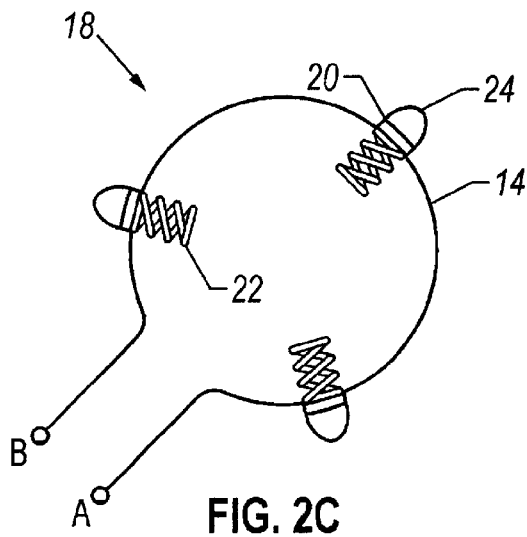

Referring now to FIGS. 2A, 2B and 2C, different views show an embodiment of a spindle 18. The views show integration of the switches 20 and the circuit 14 with the spindle 18. As shown in FIG. 2A, the spindle 18 includes switches 20 disposed within hemispherically-shaped movable members 24, which could also be any shape capable of moving radially inward toward the circumference of the spindle 18. As shown in FIG. 2B, the movable members 24 are spring-loaded, thereby enabling the movable members 24 to securely hold a CD 26 placed on the spindle. FIG. 2B further shows that when the CD 26 is properly placed on the spindle 18, the circuit 14 has a closed connection between point A and point B. Placing a CD 26 on the spindle 18 moves each movable member 24 radially inward toward the circumference of the spindle 18 to permit the switches 20 to transition from a disconnected position to a connected position, as shown in FIG. 2B.

Referring now to FIG. 2C, a top view of one embodiment shows the circuit 14 when a CD is not present. As shown, the movable members 24 no longer press radially inward toward the circumference of the spindle 18. Instead, the springs 22 press the movable members 24 away from the circumference of the spindle 18. As a result of the spring action, the switches 20 no longer connect, but remain disconnected. Thus, the circuit 14 is not completed and there is no electrical connection between point A and point B.

Figure 4A:
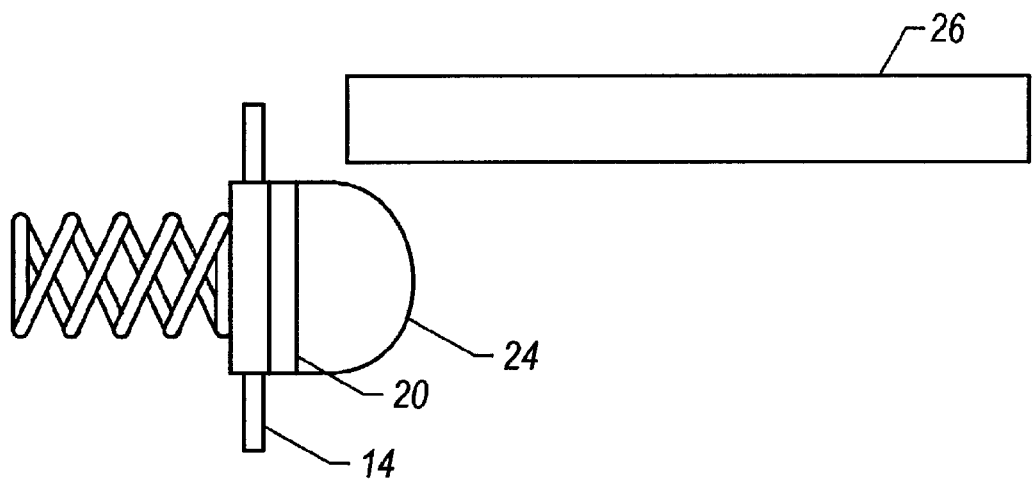
FIGS. 4A, 4B, and 4C represent several side views of the snap switch in accordance with embodiments of the present invention.
Figure 4B:
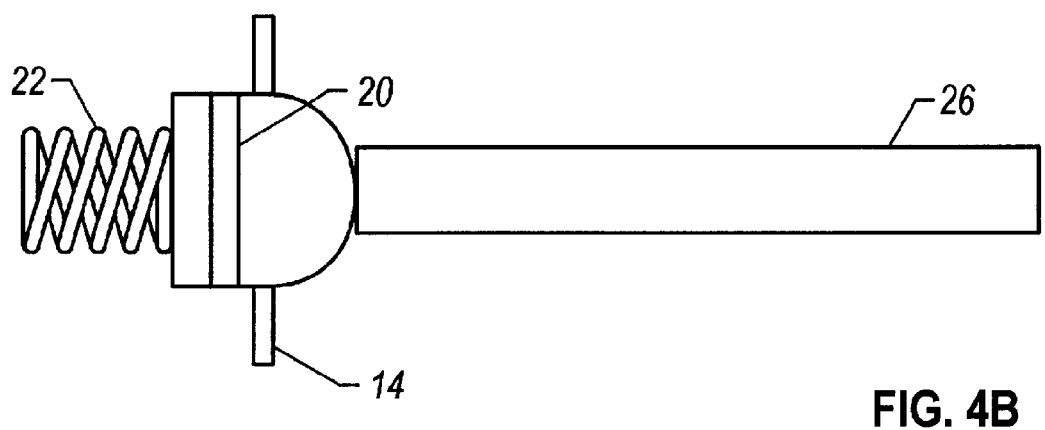
Figure 4C:
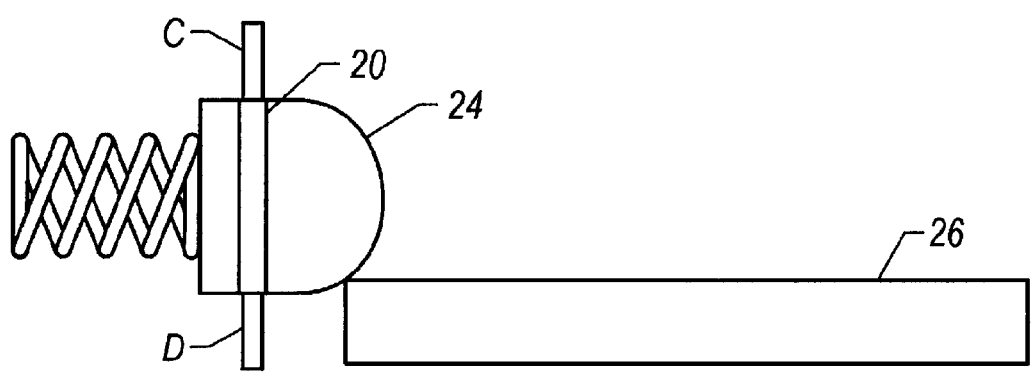

With reference to FIGS. 4A, 4B, and 4C, three different pictorial diagrams show correct and incorrect positioning of the media on the tray. The figures show a close-up side view of CD 26 placement onto a spindle (not shown) from the perspective of the inner edge of the CD against a movable member 24 aligned along the outer circumference of the spindle. FIG. 4A shows "Position 1," which represents the movable member 24 before placing CD 26 on a spindle and the movable member 24 when seating CD 26 incorrectly on top of a spindle. In Position 1, the spring receded into the spindle area. Therefore, there is no connection of switch 20. The circuit 14 does not have an electrical path through the movable member 24 because the switch 20 is in a disconnected state thereby preventing a conductive electrical path. FIG. 4B represents "Position 2." Position 2 represents the position of the movable member 24 with reference to the circuit 14 during installation of a CD 26 or when the seating of CD 26 is incorrect on the spindle. In position 2, the seating of the CD 26 excessively compressed spring 22 thereby preventing the conductive ring in the switch 20 from making contact with the circuit 14. FIG. 4C represents "Position 3." Position 3 represents the position of the movable member 24 when the CD 26 is flush with the tray bottom and properly attached to the spindle. The conductive ring in the switch 20 makes full contact with the circuit 14, thereby closing the circuit 14 between the point just before, Point C and the point just after, Point D, of the switch 20.

FIGS. 3A, 3B and 3C represent an alternate embodiment of the invention in which the circuit is not incorporated into the spindle, but is functionally incorporated into the media tray bottom. According to this embodiment, the CD closes the circuit 14 when the CD 26 is flush with the tray bottom because the switches 24 are located on the tray bottom. FIG. 4A shows a perspective view of circuit 14 when a CD is not present. In the embodiment, the movable members 24 do not lie in the circumference of the spindle 18. Instead, the movable members 24 are integral with the receiving area of the tray (not shown). The area of the CD that makes contact with the movable members 24 is the interior area where no data is present. When a CD is seated on the tray, the CD presses the movable members 24 into the tray where the circuit 14 is located. As a result of the spring 22 action, when a CD is not present, the switches 20 are not actuated and remain disconnected. Thus, the circuit 14 is not completed and there is no electrical connection between point A and point B.

FIG. 4B shows a cross-section view of the embodiment in which the switches are incorporated with one skilled tray. In this figure, the switch 20A is shown with a CD 26 actuating the switch 20A and completing the circuit 14. FIG. 4C shows a cross-section view of the embodiment in the art will appreciate that the embodiment described is illustrative of one of many types of switches capable of being incorporated into the embodiments described herein. For example, one of ordinary skill could incorporate "not" enabled switches or switches with other switching mechanisms and remain within the scope of the present invention. As shown in FIG. 4B and 4C, switches, 20 incorporated into movable member 24 by placing conductive material on the movable member. Alternatively, switches 20 could be incorporated into the spring 22 and remain within the scope of the present invention.

Figure 3:
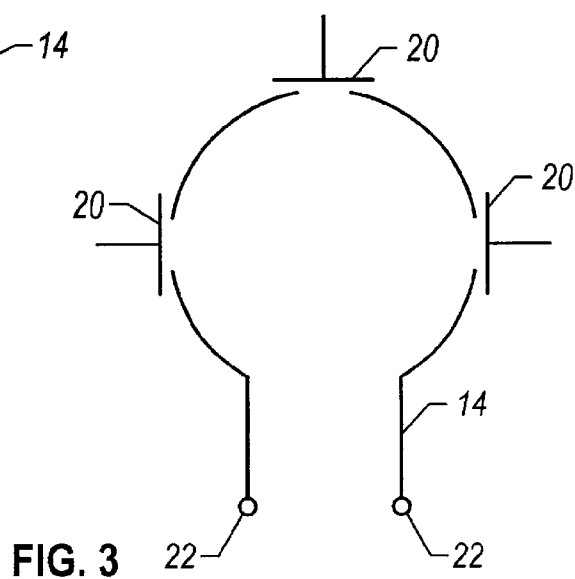
FIG. 3 is a schematic drawing of a circuit alternatively integral with either a spindle or a receiving area for media in accordance with embodiments of the present invention.

FIG. 3 represents a schematic of the circuit 14 shown in FIG. 1. A plurality of switches 20 is in an open position so that the circuit is not "closed." Thus, if a logic circuit connects to the circuit 14 through connectors 22, the circuit 14 causes a "low" or "0" signal. If the logic circuit receives a "low" or "0" signal, as discussed below, the spindle 18 shown in FIG. 1 does not spin. On the other hand, if and only if each and every switch 20 is closed, the circuit 14 causes a "high" or "1" signal to a logic circuit connected to circuit 14. If a "high" or "1" signal communicates to the logic circuit connected to circuit 14, then the spindle 18 rotates. Alternatively, the logic circuit could be arranged in reverse fashion whereby the circuit is "not" enabled. Under such an embodiment, the switches could be designed by one of ordinary skill in the art as always actuated unless improper seating is detected, and a "high" or "1" signal communicates to the logic circuit connected to circuit 14 that the spindle 18 should not rotate.

Figure 5:
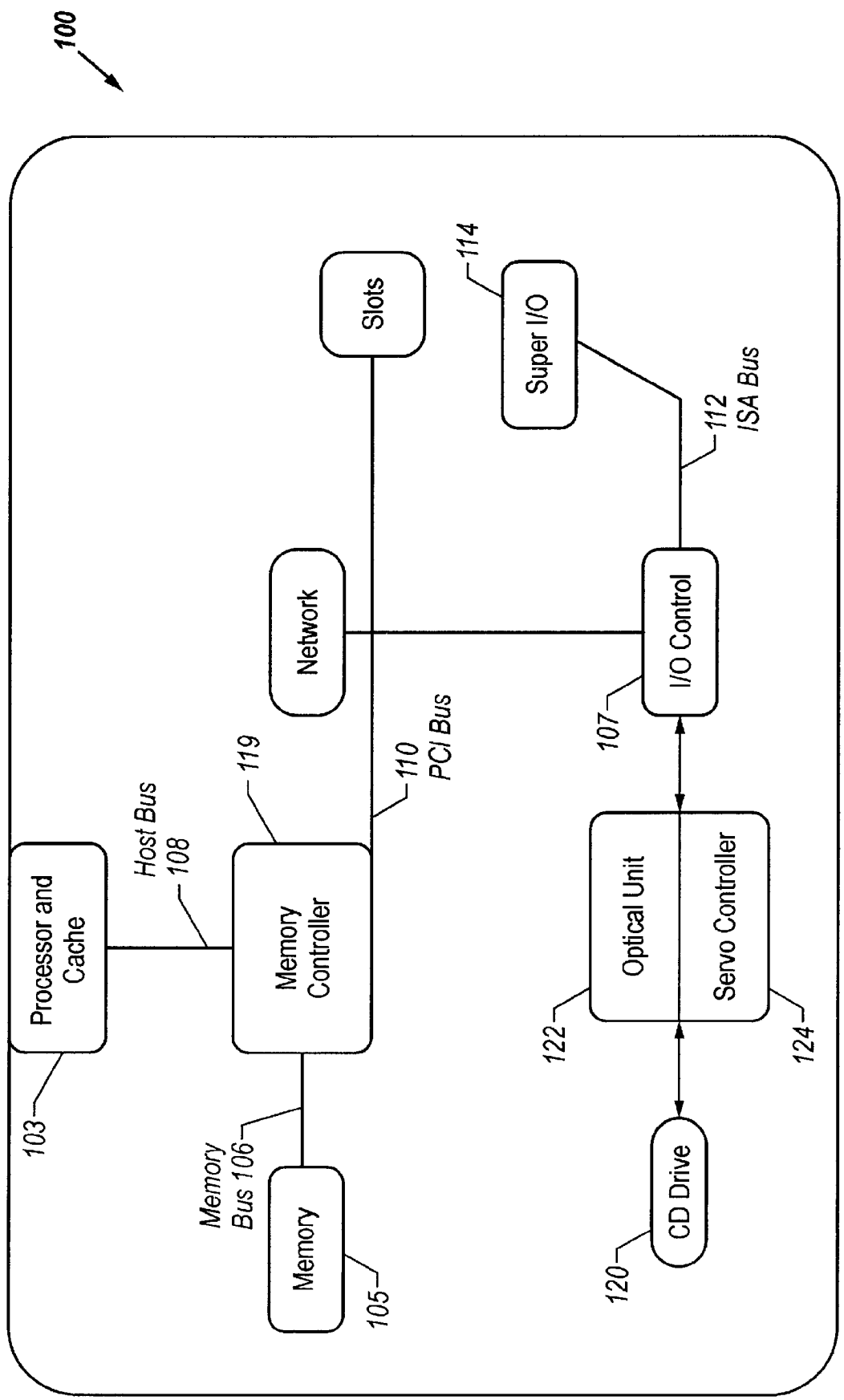
FIG. 5 is a block diagram illustrating a computer system including a feedback system for the CD drive in accordance with an embodiment of the present invention.

FIG. 5 shows a block diagram of a computer system 100. The computer system 100 includes a processor and cache 103 electrically coupled to a memory controller 119 via a host bus 108. The memory controller 119 is further coupled to memory 105 through a memory bus 106. The memory controller 119 is further coupled to an input/output control (I/O controller) 107 via a PCI (Peripheral Component Interconnect) bus 110. The I/O controller 107 is electrically coupled to a super input/output controller (Super I/O Controller) 114 through an ISA (Industry Standard Architecture) bus 112.

The I/O controller 107 is electrically coupled to Optical Unit 122 and Servo Controller 124. The Optical Unit 122 and Servo Controller 124 are further electrically coupled to a CD ROM drive/player, a DVD disk drive/player or other drive that optically reads or writes to circular media, hereinafter referred to collectively as CD Drive 120. The Optical Unit 122 and Servo Controller 124 extract signals from a CD placed on a tray or drawer ejected from the CD drive 120. The Servo Controller 124 works with the Optical Unit 122 to control a spindle motor (not shown) at the appropriate rate in order to read the data from the CD. The Servo Controller 124 and the Optical Unit 122 in combination control the rotation of the CD on a spindle attached to the spindle motor.

Referring to FIGS. 2A, 2B, and 2C in combination with FIG. 5, the electrical lines of circuit 14 in FIG. 2B are incorporated into the spindle 18 as shown in FIG. 2A and are included as part of CD Drive 120 shown in FIG. 5. The electrical leads protruding from the spindle that are electrically coupled to the circuit discussed above in relation to FIG. 3 are further electrically coupled to the I/O control 107 through the Optical Unit 122.

The circuit 14 shown in FIG. 3 is coupled to logic circuitry located in either the optical unit 122 or the servo controller 124 that in turn is electrically coupled to the I/0 control 107. The general operation of an optical unit and servo controller in media drives is well known. The logic circuitry enables the servo controller to respond to an indication from the circuit 14 that an optical CD placed on the spindle 18 is not properly seated.

If, for example, the circuit 14 is not "closed" the logic circuitry generates a "low" or "0" signal which is transmitted via the I/O control 107 to the servo controller 124 or directly to the servo controller 124. The servo controller responds by preventing the spindle 18 from rotating. In addition, the logic circuitry provides a signal to a light-emitting diode (LED) coupled to the circuit 14 so that the LED provides an indicator light that an optical CD is properly seated on the spindle 18.

In another example, logic circuitry transmits a signal to either a user or to an application program, such as a Basic Input Output System (BIOS) program. The signal is received by the BIOS program where it has been set up by the user to either allow the CD drive to operate despite the signal indicating improper seating or to prevent the CD drive from operating. Alternatively or additionally, the logic circuitry transmits a signal to a light-emitting diode (LED) that indicates either proper or improper seating While the invention has been described with reference to various embodiments, it will be understood that these embodiments are illustrative and that the scope of the invention is not limited to them. Many variations, modifications, additions and improvements of the embodiments described are possible. Variations and modifications of the embodiments disclosed herein may be made based on the description set forth herein, without departing from the scope and spirit of the invention as set forth in the following claims.

What is claimed is:

1. An apparatus for detecting seating of a medium on a media tray comprising:

a conductive element having a first terminal and a second terminal and forming an interrupted circuit between the first terminal and the second terminal, the interrupted circuit located in the media tray;

a spindle structurally supporting and integral with the conductive element and integral with the media tray, the media tray having a receiving area that is mechanically and electrically coupled to the spindle and the conductive element, the spindle and the receiving area of the media tray adapted to receive the medium, the medium causing completion of a conductive pathway of the interrupted circuit between the first and second terminal when properly seated upon the spindle and the receiving area; and the conductive pathway between the first and second terminal of the interrupted circuit remaining incomplete when the medium is improperly seated upon the spindle and the receiving area.

2. The apparatus according to claim 1 wherein:

the spindle has a generally circular cross-sectional dimension; and the medium is a planar plate having a central circular aperture that is sized to fit over the spindle and, when seated on the spindle, causes completion of the conductive pathway of the interrupted circuit.

3. The apparatus according to claim 1 further comprising:

a plurality of switches coupled to an outer circumference of the spindle; and the media tray having a circular medium receiving area that is mechanically and electrically coupled to the spindle and the conductive element.

4. The apparatus according to claim 3 wherein:

the plurality of switches are actuated upon seating of the medium on the outer circumference of the spindle.

5. The apparatus according to claim 4 wherein:

the inner edge of the circular medium activates the plurality of switches when the medium is flush with the receiving area; and the inner edge of the medium maintains the plurality of switches in an inactive state when the medium is not flush with the receiving area.

6. The apparatus according to claim 4, wherein the activation of the plurality of switches completes the conductive pathway between the first terminal and the second terminal.

7. The apparatus according to claim 1 further comprising:

a controller coupled to the first terminal and the second terminal of the conductive element; and a servo controller coupled to the controller, wherein the completion of the conductive pathway is detected by the controller and the controller controls the servo controller to prevent the spindle from rotating the medium when the medium is not seated on the spindle.

8. A method for detection of seating of a medium, the method comprising:

providing a conductive element having a first terminal and a second terminal and forming an interrupted circuit between the first terminal and the second terminal, the interrupted circuit located in a media tray;

providing a receiving area on the media tray, wherein proper seating of the medium on the receiving area on the media tray causes completion of a conductive pathway of the interrupted circuit between the first and second terminals; and providing the receiving area on the media tray, wherein improper seating of the medium on the receiving area on the media tray causes the conductive pathway of the interrupted circuit between the first and second terminals to remain incomplete.

9. The method of claim 8, further comprising:

activating a plurality of switches integral with the receiving area when the circular medium is flush with the receiving area; and maintaining the plurality of switches in an inactive state when the circular medium is not flush with the receiving area.

10. The method of claim 8, further comprising:

providing a spindle structurally supporting and integral with the conductive element, the spindle adapted to receive an edge of the medium, the medium causing completion of a conductive pathway of the interrupted circuit between the first and second terminal when seated upon the spindle.

11. The method of claim 10, further comprising:

providing a plurality of switches coupled to the outer circumference of the spindle, the plurality of switches engaged in operative relation to movable members coupled to the outer circumference of the spindle; and providing a tray with a circular medium receiving area mechanically and electrically coupled to the spindle and the circuit.

12. The method of claim 11, further comprising:

actuating the plurality of switches when the circular medium is flush with the receiving area; and maintaining the plurality of switches in an inactive state when the circular medium is not flush with the receiving area.

13. The method of claim 12, further comprising:

completing the circuit when the plurality of switches are actuated; and transmitting a signal upon completion of the circuit to one of a user and an application program.

14. The method of claim 13, wherein the application program is a Basic Input Output System (BIOS) program.

15. The method of claim 13, further comprising:

providing an optical unit;

providing a servo controller;

providing a controller; and transmitting a signal upon the completion of the circuit to the optical unit, the servo controller and the controller.

* * * * *